Sept. 17, 1968 J. G. B. DE QUIROS 3,402,354
DIFFERENTIAL MEASURING RECTIFIER
Filed July 13, 1965

INVENTOR
JULIO GONZALES BERNALDO DE QUIROS
BY Richards y Geier
ATTORNEYS

United States Patent Office 3,402,354
Patented Sept. 17, 1968

3,402,354
DIFFERENTIAL MEASURING RECTIFIER
Julio Gonzalez Bernaldo de Quiros, Madrid, Spain, assignor to G.A. Messen-Jaschin, Sarnen, Switzerland, a corporation of Switzerland
Filed July 13, 1965, Ser. No. 471,551
Claims priority, application Switzerland, July 14, 1964, 9,260/64
1 Claim. (Cl. 328—146)

This invention relates to a differential measuring rectifier.

It is known in prior art to connect two rectifier circuits in opposed relationship so as to be able to withdraw at a connection point a differential voltage rectified from two A.C. voltages. This differential connection can be used to provide a regulating voltage in a D.C. regulating circuit, which will become zero when the two A.C. voltages are equal to each other. Differential rectifiers develop difficulties when the differential voltage must not vary from zero to more than a small extent, i.e. when the regulating circuit should operate with high sensitivity; the reason for this is that the current-voltage characteristic curve of the rectifier diodes is very flat close to zero and a comparatively high change in voltage is required for a small change in current. Furthermore, rectifier circuits are supplied with resistances so that comparatively high minimum A.C. voltages are required to produce a usable differential voltage.

It is also known in electrical measuring circuits to operate rectifier diodes with a D.C. pre-voltage and to superpose upon this voltage the A.C. measuring voltage. This shifts the operating range of the rectifier diodes into an adequately steep part of the current-voltage characteristic curve. However, it is not readily possible to operate differential rectifiers as well with a D.C. pre-voltage, since the two rectifier circuits are connected in opposed relationship to each other. When, in addition, a differential rectifier is to serve as a measuring device, further difficulties arise since voltage errors can develop due to the lack of symmetry caused by the differences in the characteristic curves of the rectifier diodes being used, whereby such errors can be sufficiently great so as to lie within the range of the measured voltages.

An object of the present invention is to avoid these drawbacks of prior art constructions.

Other objects of the present invention will become apparent in the course of the following specification.

In the attainment of the objectives of the present invention, it was found desirable to provide a differential measuring rectifier having two oppositely connected rectifier circuits and provided with a D.C. pre-voltage, the rectifier being characterized in that in one rectifier circuit the secondary winding of a first transformer has two equal winding halves which are wound in the same direction as the primary winding, while the positive electrodes of the two diodes are in the circuit of the secondary winding, the two negative electrodes being interconnected; in the other rectifier circuit the secondary winding of the second transformer has two equal winding halves which are wound in a direction opposite to that of the primary winding, the negative electrodes of the two diodes being in the circuit of the secondary winding and the two positive electrodes being interconnected; the centers of the windings of the two secondary windings are connected to a constant D.C. voltage, and the two rectifier circuits are interconnected in opposed relationship by two resistances constituting a voltage divider.

The construction of the present invention makes it possible to use a single source of D.C. voltage for the prevoltage at the contacts of the voltage divider, so that a D.C. pre-voltage with superposed difference of the two measured voltages can be withdrawn.

When diodes are used which have within the manufacturing tolerances equal temperature characteristic curves and equal current-voltage characteristic curves, then the detrimental influences can be kept so low that it is possible to effectively rectify alternating voltages from inductive measuring instruments of a few millivolts.

The invention will appear more clearly from the following detailed description when taken in connection with the accompanying drawing showing by way of example, a preferred embodiment of the inventive idea.

Figure 1:
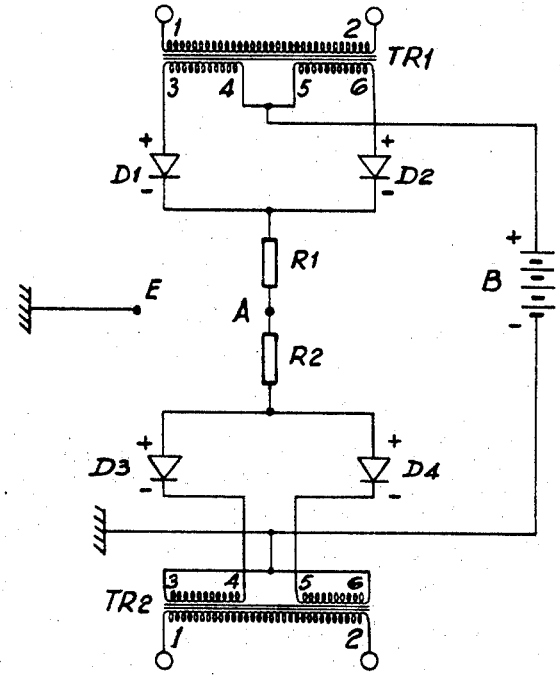
FIGURE 1 is a diagram showing a differential measuring rectifier of the present invention.

The differential measuring rectifier shown in the drawing and constructed in accordance with the principles of the present invention has a first rectifier circuit containing a transformer TR1 and two diodes D1 and D2, as well as a second rectifying circuit having a transformer TR2 and two diodes D3 and D4. The two rectifier circuits are interconnected in opposed relationship by a voltage divider having two ohmic resistances R1 and R2. The two transformers TR1 and TR2 are precision transformers; each of these transformers has a primary winding 1–2 and two secondary windings 3–4 and 5–6 which are equal to each other and which are connected in series to provide a central connecting point.

The two rectifier circuits are different. In the first rectifier circuit, the ends 4 and 5 of the secondary windings are joined and the positive electrodes of the two diodes D1 and D2 are connected with the ends 3 and 6, respectively, of the secondary transformer windings. The negative electrodes of the diodes D1 and D2 are jointly connected to the resistance R1.

In the second rectifier circuit the ends 3 and 6 of the secondary windings are interconnected and the negative electrodes of the two diodes D3 and D4 are connected to the ends 4, 5, respectively, of the secondary windings. The positive electrodes of the diodes D3 and D4 are jointly connected to the resistance R2.

The diodes are supplied with direct current, since the connecting point of the winding ends 4 and 5 of the transformer TR1 is connected with a positive pole of a battery B. The negative pole of the battery B is connected with the connecting point of the secondary winding ends 3 and 6 of the transformer TR2. The negative pole is also grounded. The connecting point A of the voltage divider constituted by the resistances R1 and R2 has in relation to ground E a D.C. voltage:

$$V_0 = \frac{V_B \cdot R_2}{R_1 + R_2}$$

which is superposed as D.C. voltage upon the difference of the two measured voltages supplied to the transformers TR1 and TR2.

By way of example, let it be assumed that the battery voltage $V_B = 12$ volts while at the resistances $R_1 = R_2$ in the connecting point A there is a pre-voltage $V_0 = 6$ volts. Due to this D.C. pre-voltage of the diodes it is possible to register changes in the difference of measured voltages amounting to millivolts as being superposed to the prevoltage at the connecting point A or measuring and/or regulating purposes. Diodes are thereby used which have equal temperature characteristic curves and equal current voltage curves within their manufacturing tolerances. Furthermore, the four diodes are joined as a single construction unit so that they have the same temperature.

Furthermore, the diodes are protected from such changes in temperature which vary substantially from those of the suppliers of the measured values.

Figure 2:
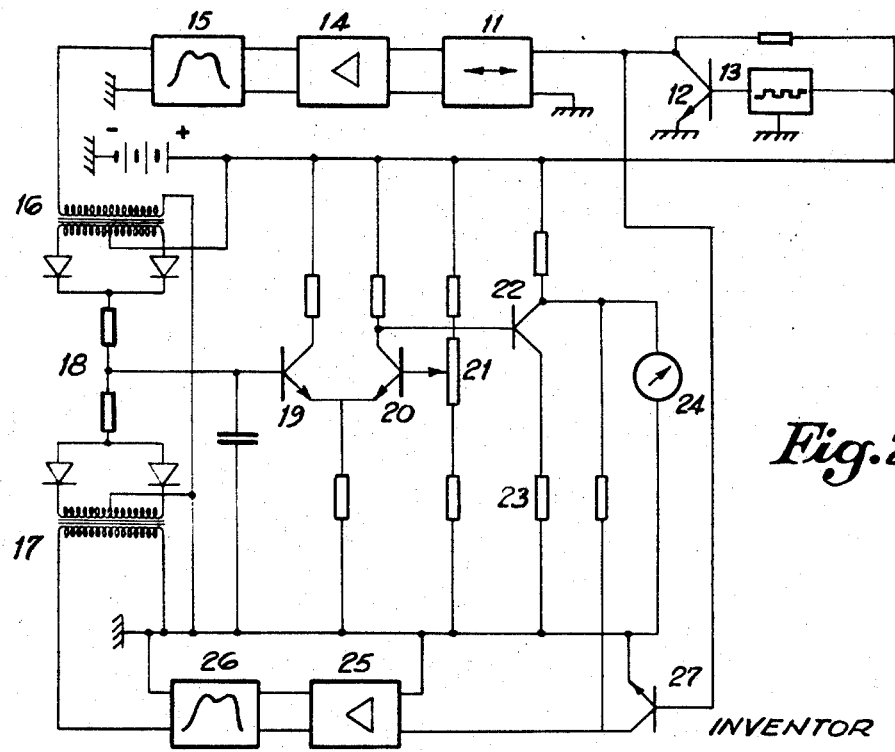
FIGURE 2 is a diagram showing a measuring regulating circiut provided with a differential measuring rectifier of the present invention.

The example illustrated in FIG. 2 pertains to a measuring device for electrically measuring a physical value transformed into a change in length, for example, the torque or shearing force of a rotary shaft. For that purpose an inductive instrument 11 transmitting the value being measured is used. The instrument 11 is of a type well known in the art and is provided with a tongue changing its position within an air gap to an extent depending upon the size of the value being measured. The tongue through induction changes varies in amplitude a D.C. voltage. The changes in the length of the tongue can be in the range of one-thousandth of a millimeter, and the changes in the amplitude of the measuring voltage can be in the range of millivolts. In order to provide usable measured data, it is necessary to compensate all the detrimental influences which could affect the electrical measuring circuits.

A rectangular voltage of high frequency is supplied to the instrument 11 in that stabilized D.C. voltage is broken up by a transistor 12; this transistor is operated by the rectangular voltage of a frequency-stabilized multi-vibrator 13. The measuring voltage is transmitted by an impedance transformer 14 and a filter 15 into a pure sinus-shaped A.C. voltage which is transmitted to the transformer 16 of the differential measuring rectifier. The rectifier is subjected to a preliminary voltage in that the middle of the secondary winding of the transformer 16 is connected to the positive pole of a D.C. source, while the middle of the secondary winding of the counter transformer 17 is connected to earth and to the negative pole of the D.C. source. At the contact 18 of the voltage divider a rectified measuring voltage is produced which is superposed upon the partial pre-voltage; the measuring voltage operates the base of a transistor 19, which jointly with a transistor 20 forms a differential amplifier, whereby the base voltage of the transistor 20 is adjustable by a voltage divider 21. The base of an output transistor 22 is operated depending upon the voltage difference, whereby the operating current of the transistor 22 produces by means of a resistance 23 a voltage which is indicated upon the indicating instrument 24.

To eliminate any detrimental influences upon the described measuring circuit, an electrically equivalent compensating circuit is used which is provided with an impedance transformer 25 and a filter 26; these two devices are the same in construction and are operated in the same manner as the devices 14 and 15 in the measuring circuit. The impedance transformer 25 receives a rectangular voltage which is equivalent to that of the measuring voltage of the instrument 11, in that the voltage indicated by the instrument 24 is broken up by a transistor 27 which is operated in rhythm with the multi-vibrator. The sinus-shaped compensating voltage received from the filter 26 is transmitted to the counter-transformer 17 of the differential rectifier. If the two primary voltages in the transformers 16 and 17 are equal to each other, then the measured value indicated in the instrument 24 is stable. If the voltage received from the instrument 11 differs from the compensation voltage, then the differential voltage in the rectifier and, therefore, in the differential amplifier will change until they again will be regulated by the compensation circuit.

This measuring device is so sensitive that it requires diodes with specific equal characteristic values for the differential rectifier. The high sensitiveness is possible only with pre-tensioned diodes. Practical experience has demonstrated that the differential measuring rectifier of the present invention satisfies the most stringent measuring requirements.

It is apparent that the example shown above has been given solely by way of exemplification and not by way of limitation and that it is subject to many variations and modifications within the scope of the present invention. All such variations and modifications are to be included within the scope of the present invention.

What is claimed is:

1. A differential measuring rectifier, comprising, in combination, a first rectifier circuit, a second rectifier circuit, a first transformer having primary and secondary windings, a second transformer having primary and secondary windings, the secondary winding of the first transformer being included in the first rectifier circuit and consisting of two equal winding halves wound in the same direction as the primary winding, the first rectifier circuit further including two diodes, the second rectifier circuit including two other diodes, each of said diodes having a positive electrode and a negative electrode, the positive electrodes of the diodes in the first rectifier circuit being connected to the secondary winding of the first transformer, the negative electrodes of the diodes in the first rectifier circuit being interconnected, the secondary winding of the second transformer being included in the second rectifier circuit and consisting of two equal winding halves wound in the opposite direction as the primary winding, the negative electrodes of the diodes in the second rectifier circuit being connected to the secondary winding of the second transformer, the positive electrodes of the diodes in the second rectifier circuit being interconnected, a source of constant D.C. voltage connected to the centers of the secondary windings of the two transformers to provide a D.C. pre-voltage, and two resistances interconnected in series and constituting a voltage divider interconnecting the two rectifier circuits in opposed relationship.

No references cited.

ARTHUR GAUSS, *Primary Examiner.*

J. D. FREW, *Assistant Examiner.*